United States Patent
Tai

(10) Patent No.: US 6,426,742 B1
(45) Date of Patent: Jul. 30, 2002

(54) METHOD FOR CONTROLLING SWITCH OF INPUT MODE OF KEYBOARD INSTRUCTIONS

(75) Inventor: Jen-Wen Tai, Hsin-Tien (TW)

(73) Assignee: Shin Jiuh Corporation, Taipei Hsien (TW)

( * ) Notice: Subject to any disclaimer, the term of this patent is extended or adjusted under 35 U.S.C. 154(b) by 0 days.

(21) Appl. No.: 09/520,140

(22) Filed: Mar. 7, 2000

(51) Int. Cl.$^7$ ................................................. G09G 5/00
(52) U.S. Cl. ........................ 345/168; 345/156; 345/167; 345/157; 341/22
(58) Field of Search ................................ 345/168, 156, 345/167, 157; 710/200, 14, 8, 16; 341/22

(56) References Cited

U.S. PATENT DOCUMENTS 6,005,496 A * 12/1999 Hargreaves et al. ........ 345/168
6,295,052 B1 * 9/2000 Kato et al. .................. 345/179
6,275,216 B1 * 8/2001 Kitamura .................... 345/171

* cited by examiner

*Primary Examiner*—Richard Hjerpe
*Assistant Examiner*—Ali Zamani
(74) *Attorney, Agent, or Firm*—Bacon & Thomas, PLLC

(57) ABSTRACT

A method for controlling switch of input mode of keyboard instructions is to provide and load a program to intellectualize an auxiliary keypad without forcing any of or both the keypad and a main keyboard to retain at a specified state. In other words, the program of the keypad will read the present status flag of the keypad and the main keyboard and put them in memory. Hence, when an arbitrary key of the keypad is pressed, the program will compare whether the state of the keypad and the main keyboard are identical or not; if positive, a key code from the keypad is acceptable, otherwise, a Num Lock code will be transmitted to a host frame of a notebook computer for changing the state of the main keyboard into that of the keypad for receiving a key code from the keypad. After transmission of the key code to the host frame, the program will send the Num Lock code again to the host frame for restoring the state of the main keyboard while the keypad remains its state unchanged.

10 Claims, 2 Drawing Sheets

METHOD FOR CONTROLLING SWITCH OF INPUT MODE OF KEYBOARD INSTRUCTIONS

BACKGROUND OF THE INVENTION

This invention relates generally to a method for controlling switch of input mode of keyboard instructions, more particularly to a method basing on an extra auxiliary keypad independent to a main keyboard, wherein both the keypad and the main keyboard are workable without interaction for easy input of figures or characters.

In appealing to portability, an existing notebook computer is usually made as smaller as possible, wherein a plurality of input keys are arranged in a main keyboard for input of figures and characters concurrently; a "Num Lock key", is designated for switching back and forth between those two input modes—the figure-input and the character-input mode. However, it is somewhat inconvenient and inefficient for input of figures and characters by switching repeatedly between modes.

In view of abovesaid defect, an externally coupled auxiliary keypad extended from the main keyboard of the notebook computer has been introduced later on to serve as an extra exclusive small keyboard for input of figures, so that a user needs not to press a mode-switch key each time when he is intended to change the input mode. Uncoincidentally, the "Num Lock key" of the keypad is interactive with that of the main keyboard because they transmit the same key code to the host notebook computer synchronously, or in other words, when the keypad is set "ON", the main keyboard enters "ON" state too (figure-input mode), hence, input of characters in the main keyboard will be affected inevitably.

For eliminating this drawback, some keypads are designed to force the main keyboard to enter "OFF" state (non-figure input mode) in the way:

"If the keypad enters "ON" state and an arbitrary key of the keypad is pressed, a Num Lock code will be transmitted to the host frame for changing the "Num Lock key" of the main keyboard into "ON" state, then a key code is sent to the host frame, and after that, another Num Lock code is sent to the host frame for changing back the main keyboard into original "OFF" state." In short, the main keyboard is supposed to enter "ON" state temporarily when, and only when, an arbitrary key of the keypad is pressed, or it is kept staying at "OFF" state otherwise. When the keypad is "OFF," and so is the main;keyboard, both can send the same key code to the host frame without needing transmission of other codes. However, such, an arrangement confines the "Num Lock key" of the main, keyboard normally under "OFF" state will limit the same for taking part in building function keys.

SUMMARY OF THE INVENTION

The primary object of this invention is to provide and load a program for controlling switch of input mode of keyboard instructions to thereby intellectualize a keypad without forcing any of or both the keypad and a main keyboard to retain at a specified state. In other words, the program of the keypad will read the present status flag of the keypad and the main keyboard and put them in memory. Hence, when an arbitrary key of the keypad is pressed, the program will compare whether the state of the keypad and the main keyboard are identical or not; if positive, a key code from the keypad is acceptable, otherwise, a Num Lock code will be transmitted to a host frame of a notebook computer for changing the state of the main keyboard into that of the keypad for receiving a key code from the keypad. After transmission of the key code to the host frame, the program will send the Num Lock code again to the host frame for restoring the state of the main keyboard while the keypad maintains at its original state.

Another object of this invention is to provide and load a program for controlling switch of input mode of keyboard instructions, which, the program, can be loaded in a main keyboard instead of a keypad for association with an average keypad.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention to be made later are described briefly as follows in which.

DETAILED DESCRIPTION OF THE PREFERRED EMBODIMENT

Figure 1:
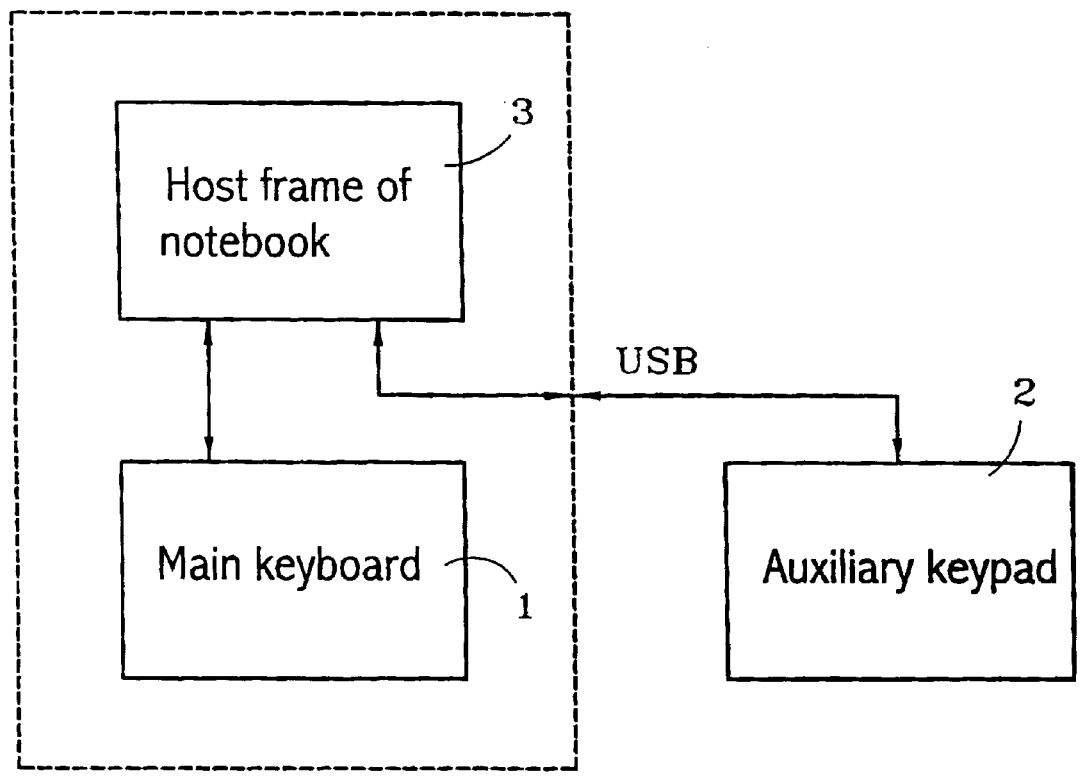
FIG. 1 is a schematic view showing an embodiment of this invention.

As shown in FIG. 1, an auxiliary keypad 2 is externally coupled to a host frame 3 of a notebook computer in addition to a main keyboard 1 for easy input of instructions. A program for controlling switch of input mode intellectualizes the keypad 2 without needing neither the main keyboard 1 nor the keypad 2 being kept constantly in some specified state, namely, the program can put the present status flag of both the main keyboard 1 and the keypad 2 in memory. Therefore, when an arbitrary key of the keypad 2 is pressed, the program will read and compare if the status flag of both the keypad 2 and the main keyboard 1 are identical or not; if positive, the program will instruct to transmit a key code, otherwise, send a Num Lock code to the host frame 3 to have the status flag of the main keyboard 1 changed into the same with that of the keypad 2 for the host frame 3 to receive the key code of the keypad 2. After it has been done, the program is supposed to provide a Num Lock code again to the host frame 3 to restore the state of the main keyboard 1 while the keypad 2 remains its state unchanged. By doing this way, the keypad 2 and the main keyboard 1 are independent to each other for easy input of figures and characters.

In paring the keypad 2 of this invention with the main keyboard 1, the initial state must be well noted so that a user will fully understand the system configuration and the correct way to operate. In using the keypad 2, two possible situations should be noted:

1. The keypad 2 has been coupled with the host frame 3 before booting. The initial state of the keypad 2 and the main keyboard 1 are both "ON" after booting.

2. The keypad 2 has not yet been coupled with the host frame 3 before booting. The initial state of the keypad 2 and the main keyboard 1 are both "ON" after booting.

Figure 2:
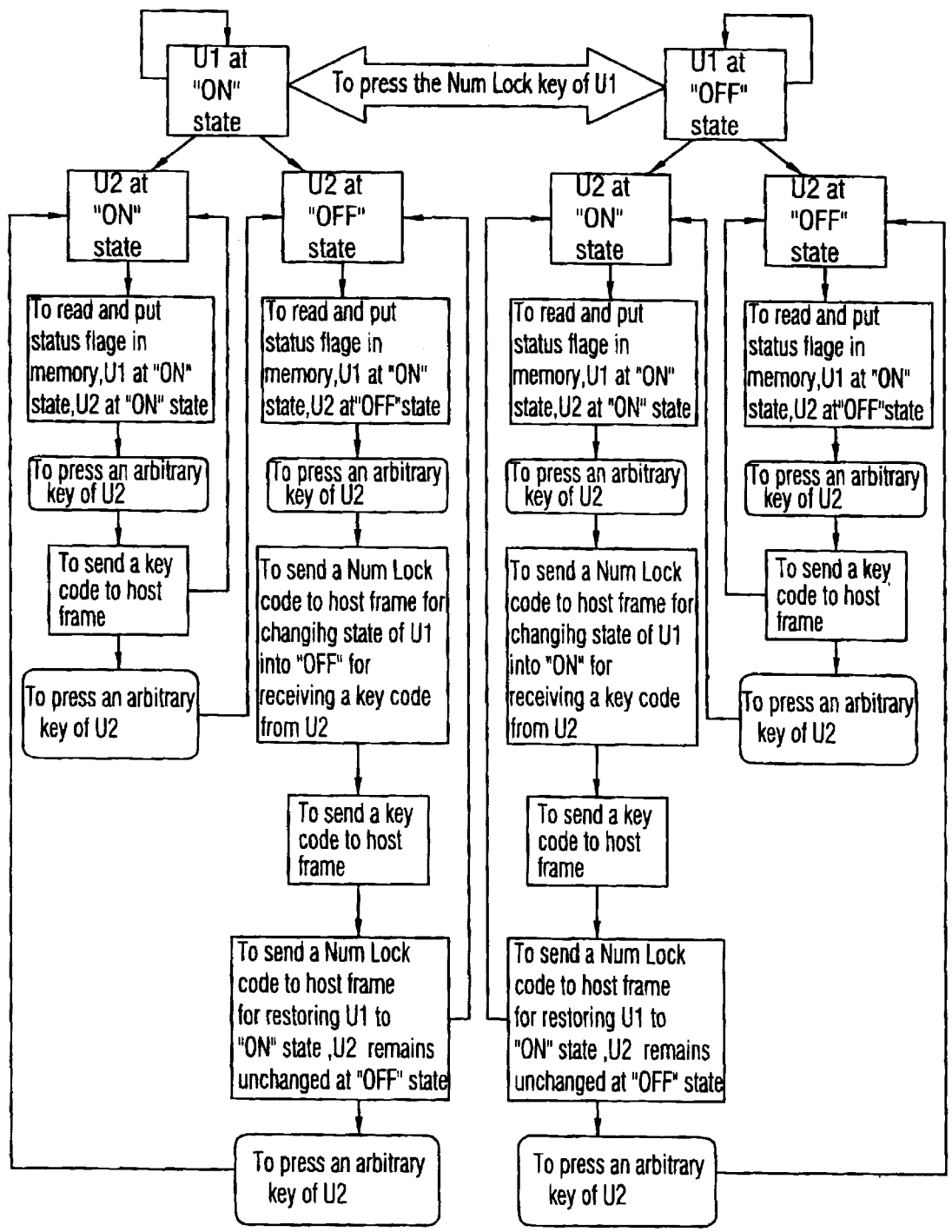
FIG. 2 is a block diagram showing a program flowchart for controlling switch of input mode of keyboard instructions.

Referring to FIG. 2, after the main keyboard 1 (abbreviated as U1 hereinafter) and the keypad 2 (abbreviated as U2 hereinafter) have been coupled to the host frame 3, and the input mode of both U1 and U2 are supposed at "OFF" state, the program of U2 will read and put the status flag of both parties in memory. When an arbitrary key of U2 is pressed, a key code will be sent out while U2 maintains at "OFF" state.

Moreover, if the "Num Lock key" of U2 is pressed this time to change the state of U2 from "OFF" into "ON" state, the program of U2 will read and put the state of U1 as "OFF" and U2 as "ON" in memory. When an arbitrary key of U2 is pressed, a Num Lock code will be sent to the host frame 3 for changing the state of U1 from "OFF" into "ON" in order to receive a key code from U2. After the key code has been received by the host frame 3, the program will instruct to send the Num Lock code again to the host frame 3 for restoring the state of U1 from "ON" back to "OFF" while the state of U2 is maintained at "ON," then the "Num Lock key" is pressed again to have the state of U2 returned to "OFF."

In the case the input mode of U1 is "OFF" while that of U2 is "ON," the program of U2 will read and put their status flags in memory accordingly. When an arbitrary key of U2 is pressed, a Num Lock code will be sent to the host frame 3 for changing the state of U1 from "OFF" into "ON" to enable the host frame 3 to receive a key code from U2. After the key code has been received by the host frame 3, another Num Lock code will be sent to the host frame 3 for changing back the, state of U1 to "OFF" while the state of U2 is maintained at "ON." At this time, if the "Num Lock key" of U2 is pressed again, U2 will enter "OFF" state and the program will read and put the status flag of U1 as "OFF" and U2 as "OFF" in memory so that when an arbitrary key of U2 is pressed, a key code will be sent to the host frame 3 while U2 remains unchanged at "OFF" state. If the "Num Lock key" of U2 is pressed again, U2 will reenter "ON" state.

In the case the input mode of U1 is "ON" while that of U2 is "OFF," the program of U2 will read and put their status flags in memory accordingly. When an arbitrary key of U2 is pressed, a Num Lock code will be sent to the host frame 3 for changing the state of U1 from "ON" into "OFF" to enable the host frame 3 to receive a key code from U2. After the key code has been received by the host frame 3, another Num Lock code will be sent to the host frame 3 for changing back the state of U1 to "ON" while the state of U2 is maintained at "OFF." At this time, if the "Num Lock key" of U2 is pressed again, U2 will enter "ON" state and the program will read and put the status flag of U1 as "ON" and U2 as "ON" in memory so that when an arbitrary key of U2 is pressed now, a key code will be sent to the host frame 3 while U2 remains unchanged at "ON" state. Another press of the "Num Lock key" of U2 will change the state of U2 from "ON" into "OFF" state.

In the case the input mode of U1 and U2;are both "ON," the program of U2 will read and put their status flags in memory accordingly. When an arbitrary key of U2 is pressed, a key code will be sent to the host frame 3 and U2 remains unchanged at "ON" state. If now the "Num Lock key" of U2. is pressed, the state of U2 is changed from "ON" into "OFF" and the program will read and put the state of U1 as "ON" and U2 as "OFF" in memory accordingly. So that when an arbitrary key of U2 is pressed, a Num Lock code will be sent to the host frame 3 for changing the state of U1 into "OFF" to enable the host frame to receive a key code from U2. After the key code has been received by the host frame 3, another Num Lock code will be sent to the host frame 3 for changing back the state of U1 to "ON" while the state of U2 is maintained at "OFF." At this time, if the "Num Lock key" of U2 is pressed again, U2 will turn into "ON" state.

By doing so, the control of switch of input mode between the main keyboard 1 and the keypad 2 is more smart and ingenious without interference to each other for simplifying input operation.

Further, the program may be loaded to the main keyboard 1 instead of the keypad 2 so that the main keyboard 1 can pair with an average auxiliary keypad 2 for realizing above-said objects.

Although, this invention has been described in terms of preferred embodiments, it is apparent that numerous variations and modifications may be made without departing from the true spirit and scope thereof, as set forth in the following claims.

What is claimed is:

1. A method for controlling switch of input mode of keyboard instructions, comprising:

a) Requesting no specified state of a main keyboard and an auxiliary keypad;

b) Using a program of said keypad to read and put status flag of said main keyboard and said keypad for remembering present respective state thereof; and c) Pressing an arbitrary key of said keypad, whereby the program of said keypad will compare whether the status flag of said main keyboard and said keypad are identical or not; if positive, a key code to be sent out is acceptable, otherwise, a Num Lock code will be sent to a host frame of a notebook computer for changing the state of said main keyboard into that of said keypad for receiving a key code from said keypad; after the key code is transmitted, the program is to send the Num Lock code again to the host frame for restoring the state of said main keyboard while said keypad remains its state unchanged; therefore, despite of the original state of said main keyboard and said keypad, controlling switch of input mode of figures or characters will become easier and more convenient without causing interference between said main keyboard and said keypad.

2. The method for controlling switch of input mode of keyboard instructions of claim 1, wherein said main keyboard may be a conventional keyboard or a keyboard of a notebook computer.

3. The method for controlling switch of input mode of keyboard instructions of claim 1, wherein said auxiliary keypad is a figure keyboard.

4. The method for controlling switch of input mode of keyboard instructions of claim 1, wherein said auxiliary keypad has been coupled with said host frame before booting, then the initial state of said auxiliary keypad and said main keyboard both are at "ON" state after booting.

5. The method for controlling switch of input mode of keyboard instructions of claim 1, wherein said auxiliary keypad has not yet been coupled with said host frame before booting, then the initial state of said auxiliary keypad and said main keyboard both are at "ON" state after booting.

6. The method for controlling switch of input mode of keyboard instructions of claim 1, wherein the input mode of both said main keyboard and said auxiliary keypad are supposedly staying at "OFF" state (non-figure input mode), the program of said auxiliary keypad will read and put the status flag of both parties in memory accordingly; when an arbitrary key of said keypad is pressed. a key code will be sent out while said auxiliary keypad remains unchanged at "OFF" state (non-figure input mode); at this time, if a "Num Lock key" of said auxiliary keypad is pressed to change the state of said auxiliary keypad into "ON" (figure input mode), the program of said auxiliary keypad will read and input the state of said main keyboard as "OFF" (non-figure input mode) and that of said auxiliary keypad as "ON" (figure input mode) in memory, and when an arbitrary key of said auxiliary keypad is pressed, a Num Lock code will be sent to said host frame for changing the state of said main keyboard into "ON" (figure input mode) for receiving a key code from said auxiliary keypad; after the key code is sent to said host frame, the program will send again the Num Lock code to said host frame for restoring the state of said main keyboard back to "OFF" (non-figure input mode) while said auxiliary keypad remains unchanged at "ON" state (figure input mode); and, if the "Num Lock key" of said auxiliary keypad is pressed again, said auxiliary keypad will reenter the "OFF" state (non-figure input mode).

7. The method for controlling switch of input mode of keyboard instructions of claim 1, wherein the input mode of said main keyboard is "OFF" (non-figure input mode) while that of said auxiliary keypad is "ON" (figure input mode), the program of said auxiliary keypad will read and put the respective status flag in memory accordingly; when an arbitrary key of said auxiliary keypad is pressed, a Num Lock code; will be sent to said host frame for changing the state of said main keyboard from "OFF" into "ON" to enable said host frame to receive a key code from said auxiliary keypad; after the key code has been received by said host frame, another Num Lock code will be sent to said host frame for changing back the state of said main keyboard to "OFF" while said auxiliary keypad remains unchanged at "ON" state (figure input mode); at this time, if the "Num Lock key" of said auxiliary keypad is pressed again, said auxiliary keypad will enter "OFF" state (non-figure input mode) and the program will read and put the status flag of said main keyboard as "OFF" (non-figure input mode) and said auxiliary keypad as "OFF" (non-figure input mode) in memory so that when an arbitrary key of said auxiliary keypad is pressed, a key code will be sent to said host frame while said auxiliary keypad remains unchanged at "OFF" state (non-figure input mode); and, if the "Num Lock key" of said auxiliary keypad is pressed once more, said auxiliary keypad will reenter "ON" state (figure input mode).

8. The method for controlling switch of input mode of keyboard instructions of claim 1, wherein the input mode of said main keyboard is "ON" (figure input mode) while that of said auxiliary keypad is "OFF" (non-figure input mode), the program of said auxiliary keypad will read and put the respective status flag in memory accordingly; when an arbitrary, key of said auxiliary keypad is pressed, a Num Lock code will be sent to said host frame for changing the state of said main keyboard from "ON" (figure input mode) into "OFF" (non-figure input mode) to enable said host frame to receive a key code from said auxiliary keypad; after the key code has been received by said host frame, another Num Lock code will be sent to said host frame for restoring back the state of said main keyboard to "ON" (figure input mode) while said auxiliary keypad remains unchanged at "OFF" state (non-figure input mode); at this time, if the "Num Lock key" of said auxiliary keypad is pressed again, said auxiliary keypad will enter "ON" state (figure input mode) and the program will read and put the status flag of said main keyboard as "ON" (figure input mode) and said auxiliary keypad as "ON" (figure input mode) in memory so that when an arbitrary key of said auxiliary keypad is pressed, a key code will be sent to said host frame while said auxiliary keypad remains unchanged at "ON" state; one more press of the "Num Lock key" of said auxiliary keypad will change the state of said auxiliary keypad from "ON" into "OFF" state (non-figure input mode).

9. The method for controlling switch of input mode of keyboard instructions of claim 1, wherein the input mode of said main keyboard and said auxiliary keypad are both at "ON" (figure input mode), the program of said auxiliary keypad will read and put the respective status flag in memory accordingly; when an arbitrary key of said auxiliary keypad is pressed, a key code will be sent to said host frame and said auxiliary keypad remains unchanged at "ON" state (figure input mode); if now the "Num Lock key" of said auxiliary keypad is pressed, the state of said auxiliary keypad is changed from "ON" (figure input mode) into "OFF" (non-figure input mode), and the program will read and put the state of said main keyboard as "ON" (figure input mode) and said auxiliary keypad as "OFF" (non-figure input mode) in memory accordingly; when an arbitrary key of said auxiliary keypad is pressed, a Num Lock code will be sent to said host frame for changing the state of said main keyboard into "OFF" to enable said host frame to receive a key code from said auxiliary keypad; after the key code has been received by said host frame, another Num Lock code will be sent to the host frame for restoring back the state of said main keyboard to "ON" (figure input mode) while said auxiliary keypad remains unchanged at "OFF" state (non-figure input mode); and, at this time, if the "Num Lock key" of said auxiliary keypad is pressed once more, said auxiliary keypad will turn into "ON" state (figure input mode).

10. The method for controlling switch of input mode of keyboard instructions of claim 1, wherein the program can be loaded to said main keyboard instead of said auxiliary keypad so that said main keyboard can operate cooperatively with an average auxiliary keypad.

\* \* \* \* \*